(12) United States Patent
Stauder et al.

(10) Patent No.: US 9,036,030 B2
(45) Date of Patent: May 19, 2015

(54) COLOR CALIBRATION OF AN IMAGE CAPTURE DEVICE IN A WAY THAT IS ADAPTIVE TO THE SCENE TO BE CAPTURED

(71) Applicant: THOMSON LICENSING, Issy de Moulineaux (FR)

(72) Inventors: Jurgen Stauder, Montreuil/Ille (FR); Patrick Morvan, Laille (FR); Corinne Poree, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/908,350

(22) Filed: Jun. 3, 2013

(65) Prior Publication Data
US 2013/0329056 A1    Dec. 12, 2013

(30) Foreign Application Priority Data
Jun. 7, 2012  (EP) .................................... 12305649

(51) Int. Cl.
*H04N 17/00* (2006.01)
*H04N 17/02* (2006.01)
*H04N 5/225* (2006.01)
*H04N 5/228* (2006.01)
*G06F 15/00* (2006.01)
*G06K 9/00* (2006.01)
*H04N 1/60* (2006.01)

(52) U.S. Cl.
CPC ........... *H04N 17/002* (2013.01); *H04N 1/6033* (2013.01)

(58) Field of Classification Search
None
See application file for complete search history.

(56) References Cited

U.S. PATENT DOCUMENTS

| 5,491,568 | A | | 2/1996 | Wan |
| 5,809,164 | A | * | 9/1998 | Hultgren, III ................. 382/162 |
| 6,791,716 | B1 | * | 9/2004 | Buhr et al. ..................... 358/1.9 |

(Continued)

FOREIGN PATENT DOCUMENTS

EP    0750419    12/1996

OTHER PUBLICATIONS

Anonymous: "ISO/TR 17321-2:2012 Graphic technology and photography—Colour characterization of digital still cameras (DSCs)—Part 2: Considerations for determining scene analysis transforms". Search Report Dated Nov. 6, 2012.

(Continued)

*Primary Examiner* — Jefferey Harold
*Assistant Examiner* — Sean Haiem
(74) *Attorney, Agent, or Firm* — Tutunjian & Bitetto, P.C.

(57) ABSTRACT

Method comprising the steps of:
choosing a set of calibration colors within said scene,
measuring each calibration color of said set such as to get a set of XYZ to represent each calibration color in the given colorimetric color space,
by using said image capture device, capturing calibration colors such as to get a set of Raw RGB values to represent each calibration color,
estimating a parametric color transform such that any set of Raw RGB values corresponding to a calibration color is transformed into a set of XYZ values corresponding to the same calibration color,
building a color calibration transform by the concatenation of the parametric color transform with an output color transform.

6 Claims, 1 Drawing Sheet

(56) References Cited

U.S. PATENT DOCUMENTS

2004/0119860 A1    6/2004  Vogel et al.
2010/0231728 A1*   9/2010  Holub .................... 348/207.2

OTHER PUBLICATIONS

Berkhin: "A Survey of Clustering Data Mining Techniques", edited by J. Kogan et al, Springer publications, Jan. 2006.
Holm: "Capture Color Analysis Gamuts", Proc. 14th Color Imaging Conference, pp. 108-113, Scottsdale, Arizona, Nov. 2006.
Hunt: "The reproduction of colour", Sixth Edition, Wiley, Jan. 2004.
Recommendation ITU-R BT.709-5 "Parameter values for the HDTV standards for produdion and internaiional programme exchange", BT Series, Apr. 2002.
Murakami, et al: "Evaluating Wide Gamut Color Caputre of Multispectral Cameras", Proc. of 16th IS&T Color Imaging Conference, Portland, Nov. 10-15, 2007.
SMPTE, Recommended Practice RP177-1993 "Derivation of Basic Television Color Equations", Society of Motion Picture and Television Engineers, Jan. 1993.
Urban, et al.: "Color Correction by Considering the Distribution of Matemers within the Mismatch Gamut", Proc. 15th IS&T Color Imaging Conference, pp. 222-227, Jan. 2007.
ISO, Technical Commitee 42. "Photography and graphic technology-Extended colour encoding for digital image storage, manipulation and interchnage-Part1, Architecture and requirerments", Apr. 4, 2002.

* cited by examiner

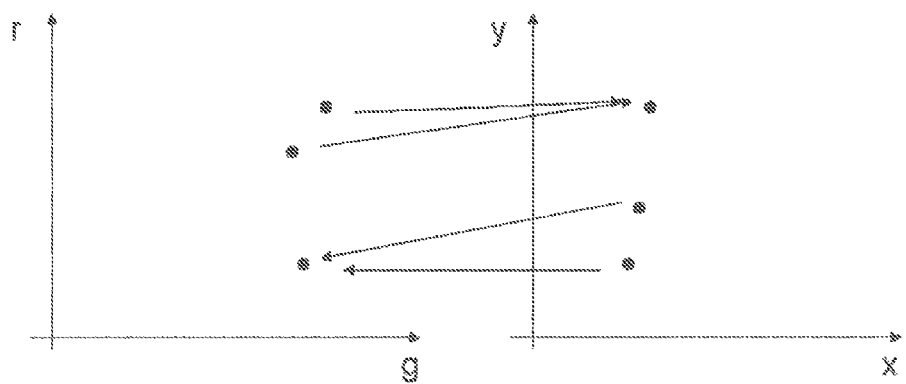

COLOR CALIBRATION OF AN IMAGE CAPTURE DEVICE IN A WAY THAT IS ADAPTIVE TO THE SCENE TO BE CAPTURED

This application claims the benefit, under 35 U.S.C. §119 of European Patent Application 12305649.1, filed Jun. 7, 2012.

TECHNICAL FIELD

The invention concerns a method and a system for the color calibration of a video or stills camera in a way that is adaptive to the scene to be captured.

BACKGROUND ART

Color Encoding:

When video cameras or stills cameras are used to capture images from a scene, in many cases, the aim is that the resulting image reproduces colors on a display device that are as close as possible to the real colors in the scene. Therefore, the camera needs to be calibrated. To understand this problem of camera calibration, some background on color encoding and camera calibration is reminded below.

Each image generated by a camera consists of color signal values that are expressed as RGB color space coordinates in a color space which is device-dependent. These color coordinates are usually binary encoded. Such a color space depends on the type of the camera. Therefore, after having captured a scene, a camera represents colors of this scene by color coordinates. According to the terms of the ISO 22028-1, such a process of color representation is called scene-referred color encoding. See "Photography and graphic technology—Extended colour encodings for digital image storage, manipulation and interchange—Part 1", in Architecture and requirements, ISO 22028-1. Scene referred color encoding identifies color coordinates that are meant to be directly related to radiometric or photometric entities of the real world. For example, the raw RGB output values of a digital camera are usually transformed to scene-referred R'G'B' values, such as defined by the output-referred ITU-R BT.709 standard. Such a color transformation corresponds to a calibration of the camera since the standard ITU-R BT.709 specifies the relation between scene-referred R'G'B' values and photometric scene values XYZ.

Output-referred color encodings are notably obtained by color matching experiments. An output-referred color space and the related color matching experiment are generally defined by:
- the characteristics of the output device used to reproduce the colors of a scene, which is driven by the output-referred color coordinates, and
- the characteristics of the observer that perceives the colors reproduced by this output device.

Let us take as example the output-referred R'G'B' coordinates being input to a display device. The related trichromatic colour matching experiment is classical and involves the CIE 1931 standard (human) observer, corresponding to the average behavior of a small group of test persons. In the experiment, an observer compares the color reproduced by the display device with the color of a monochromatic light of a specific wavelength. For each wavelength, the observer adjusts the R'G'B' values such that both colors match. The result of a color matching experiment are three color matching functions (red, green and blue) indicating, for each wavelength, which R'G'B' coordinates should be input to the display device in order to match the monochromatic light.

The classical color matching function results in the output-referred R'G'B' color space of the specific RGB display device that was used at the time of the experiment. An RGB color space needs to be defined for any other RGB display device that may be used to reproduce the colors. That is why output-referred RGB color spaces are device-dependent, too.

Better known is the output-referred CIE 1931 XYZ color space based on an ideal display device, with XYZ input signals and mathematically derived XYZ primaries. CIE 1931 XYZ color space is device-independent. XYZ color coordinates encode a color according to these standardized primaries and according to the CIE 1931 standard observer.

Less known is that we could build an $R^C G^C B^C$ or $X^C Y^C Z^C$ output-referred color space that is based on a digital camera as observer. Let us recall that output-referred color spaces not only depend on the aimed display device but also on the referred camera used as observer.

Linear output-referred color spaces can be transformed into each other using a linear color transform as far as the same observer is considered. Hunt shows this for RGB-XYZ transform and the SPMTE shows this for different RGB spaces of different display devices. Trichromatic observers (such as the human eye or usual digital RGB cameras) are characterized by the spectral sensitivities of their three kinds of photoreceptors. The three corresponding sets of spectral sensitivities are directly linked to a set of three XYZ color matching functions. One set can be derived from the other but they are of different nature.

Camera Calibration:

New requirements in images production using digital cameras include the capture of scenes showing colors with wider color gamut. Directors start to light scenes on production sets with colors that are out of the color gamut of usually used proof viewing devices (such as Rec. 709 monitors). For example in music life events, modern spot lights use programmable color filters able to generate light of high degree of saturation out of the usual Rec. 709 color gamut. In traditional production using digital cameras, such colors are avoided. In straight forward signal processing, illegal RGB values may be simply dipped somewhere in the imaging chain. This causes the color output on the reference screen to be widely different from the colors that can be seen in the scene. There is a need of controlled handling of out-of-gamut colors, in which the errors are minimized.

Scene-referred color encoding is ambiguous due to sensitivity metamerism. A common camera transforms a real-world color stimulus, defined by a spectrum, into a set of three RGB color coordinates. Similarly to human eyes, cameras are subject to metamerism. This raises issues in two directions:
- A given camera may produce an identical set of RGB color coordinates for two different spectral color stimuli, called a metameric pair,
- A camera with sensitivity curves different from the human eye differs in their metameric pairs from a human observer.

The link between scene-referred camera RGB values and CIE 1931 XYZ coordinates cannot be trivial since two different spectral sensitivity curves are involved, that of the camera and that of the human eye, respectively. Camera and human eye may differ in their metameric pairs leading to non-invertible relations between RGB and XYZ coordinates such as illustrated in FIG. 1. Distinct rg points can correspond to the same xy point and vice versa. rg and xy chromaticity coordinates are obtained from the RGB scene-referred camera output values and from the output-referred CIE 1931 XYZ values, respectively, by normalization, as explained in the book entitled "The reproduction of color", from R.W.G. Hunt, Wiley, 2004, Sixth Edition.

This problem is referred to as sensitivity metamerism and can be avoided completely only if the camera satisfies the Luther condition, i.e. If its spectral sensitivities are linear combinations of the color matching functions of the CIE 1931 standard observer. Another possibility is multispectral cameras that reduce the effect of sensitivity metamerism: see the article entitled "Evaluating Wide Gamut Color Capture of Multispectral Cameras", from Yuri Murakami, Keiko Iwase, Masahiro Yamaguchi, Nagaaki Ohyama, in Proceedings of $16^{th}$ IS&T Color Imaging Conference, November 10-15, Portland, 2008.

If a given camera does not satisfy the Luther condition (such as most cameras) and if it is not multispectral but has just three color channels (such as most cameras), sensitivity metamerism cannot be avoided. In order to minimize the effects, sets of scene-referred color coordinates, for example sets of CIE 1931 XYZ values, need to be estimated from sets of raw RGB color coordinates directly outputted by the camera. This process is called in the following camera calibration.

One common way of camera calibration is to use a Mac-Beth Color Checker Chart. Given an illuminant, each color patch of this chart has a known set of XYZ color coordinates. The camera captures the chart. The set of raw RGB color coordinates obtained by the capture of the different color patches of the chart and the associated known set of XYZ values associated to these color patches are used in a linear regression model to find a linear scene analysis parametric color transform (a 3×3 matrix) that transforms sets of raw RGB values to corresponding sets of XYZ coordinates. Then, XYZ coordinates are transformed by a predetermined linear output color transform into output-referred R'G'B' coordinates. This first color transform is the camera parametric transform that transforms raw RGB values into standardized, scene-referred XYZ coordinates. The concatenation of the camera parametric transform with the output color transform gives a camera color calibration transform that transforms raw RGB values into output-referred R'G'B' coordinates.

A draft technical report from ISO proposes two preferential methods to calculate such a calibration color transform: see ISO TC 42 N 574, 2010-05-18, ISO/DTR 17321-2, ISO TC 42/WG 20, Graphic technology and photography—Colour characterization of digital still cameras (DSCs)—Part 2: Considerations for determining scene analysis transforms.

The first method is called in the report "Scene analysis transform determined using a test target" and corresponds to the already described method. The second method is called in the report "Scene analysis transform determined using spectral measurements" and is similar to the first method but instead of a test target, explicit training spectra are exposed to the camera.

The ISO report explains that—for the first method—it is preferable to choose "test patches that simulate the spectral radiances of real-world colours of interest. The report further explains that—for the second method—it is preferable to choose "training spectra that simulate the spectral radiances of real-world colours of interest".

SUMMARY OF INVENTION

As explained above, camera color calibration is an estimation process. The precision of the camera color calibration transform depends on the choice of the scene colors used for calibration. We call these colors calibration colors. Several problems can occur, notably in the following situations:

If the color gamut of the calibration colors is large with respect to the color gamut of the actual scene colors, calibration errors will increase.

If the color gamut of the calibration colors is small with respect to the color gamut of the actual scene colors, calibration errors will increase.

If the calibration colors are not distributed in color space in a way that the scene colors are well represented, calibration errors will increase.

These first three problems can be solved by the methods proposed in the ISO report. By thorough choice of "real-world colors of interest", the mentioned problems may be resolved.

But it remains a main unsolved problem of building, under life conditions or even under real-time conditions, training spectra and color test patches that correspond to "real-world colors of interest".

An object of the invention is to solve this problem.

For this purpose, the subject of the invention is a method to build a color calibration transform for the color calibration of an image capture device adapted for the capture of a specific scene, said color calibration being adapted to represent the captured colors of said scene in a specific output color space, an output color transform being predetermined that is able to transform any set of device-independent color coordinates (XYZ) representing any color in a given colorimetric color space into a set of output device-dependent color coordinates (R'G'B') representing said color in said specific output color space, said method comprising the steps of:

choosing a set of calibration colors within said scene, measuring each calibration color of said set such as to get a set of three calibration device-independent color coordinates (XYZ) to represent each calibration color in the given colorimetric color space, by using said image capture device, capturing calibration colors of said set such as to get a set of calibration device-dependent color coordinates (Raw RGB) to represent each calibration color in a device-dependent color space specific to said image capture device, estimating a parametric color transform such that any set of calibration device-dependent color coordinates (Raw RGB) corresponding to a calibration color is transformed into a set of calibration device-independent color coordinates (XYZ) corresponding to the same calibration color, building said color calibration transform by the concatenation of the parametric color transform with the output color transform.

Preferably, the calibration colors are chosen within said scene such that each calibration color corresponds to a color cluster of image pixels in an image representative of said scene captured by said image capture device, the color clusters being defined to contain pixels that are close together in the image and that have close device-dependent color coordinates (Raw RGB).

Although the document U.S. Pat. No. 5,491,568 concerns indeed color calibration, such color calibration is that of an image reproduction device as a scanner instead of that of an image capture device as in the invention. This document discloses the generation of a set of uniformly distributed color patches (step 22) that correspond to "carefully selected color patches" to be used for color calibration. In this document, the defined color patches are distributed uniformly in the color gamut of the image reproduction device (col.2, lines 13-14) as, in the invention, the defined color patches are distributed over the color gamut of the images to capture, what is totally different. As a matter of fact, in this document, the clustering of colors that is used to define the set of calibration colors is performed by an histogram calculated over the colors of the gamut of the image reproduction device to calibrate, as, in the invention, the clustering of colors that is used to define the set of calibration colors is performed over the colors of pixels of an image representative of a specific scene to be captured by the image capture device to calibrate.

An object of the invention is also a method to build a color calibration transform for the color calibration of a second image capture device adapted for the capture of a specific scene, said color calibration being adapted to represent the captured colors of said scene in a specific output color space, wherein an output color transform is predetermined that is able to transform any set of device-independent color coordinates (XYZ) representing any color in a given colorimetric color space into a set of output device-dependent color coordinates (R'G'B') representing said color in said specific output color space, wherein a first parametric color transform of a first image capture device is determined that allows the transformation of any set of $1^{st}$-device-dependent color coordinates (Raw $R_1G_1B_1$) resulting from the capture of a color by said first image capture device into a corresponding set of device-independent color coordinates (XYZ) representing the captured color in the colorimetric color space, said method comprising the steps of:

choosing a set of calibration colors within said scene, by using said first image capture device, capturing each calibration color, resulting into a set of calibration $1^{st}$-device-dependent color coordinates (Raw $R_1G_1B_1$) for each calibration color, by using said first parametric color transform, calculation of a set of three calibration device-independent color coordinates (XYZ) for each set of calibration $1^{st}$-device-dependent color coordinates (Raw $R_1G_1B_1$), in order to represent each calibration color in the colorimetric color space, by using said second image capture device, capturing each calibration color, resulting into a set of calibration 2nd-device-dependent color coordinates (Raw $R_2G_2B_2$) for each calibration color, estimating a second parametric color transform such that any set of calibration $2^{nd}$-device-dependent color coordinates (Raw $R_2G_2B_2$) corresponding to a calibration color is transformed into a calculated set of calibration device-independent color coordinates (XYZ) corresponding to the same calibration color, building said color calibration transform by the concatenation of the second parametric color transform with the output color transform.

An object of the invention is also an image capture device able to represent any color from a scene to capture either by a set of three device-dependent color coordinates (Raw RGB) in a trichromatic capture mode, either by a set of M device-dependent color coordinates (Raw Multispectral) in a multispectral capture mode, wherein M>3, comprising:

means to choose a set of calibration colors within a scene to capture, means to capture each calibration color of said set in said multispectral capture mode, resulting into a set of calibration device-dependent multispectral color coordinates (Raw Multispectral) for each calibration color, from a given predetermined calibration of said multispectral capture mode, means to calculate a set of three calibration device-independent color coordinates (XYZ) for each set of calibration device-dependent multispectral color coordinates (Raw Multispectral), in order to represent each calibration color in a given colorimetric color space, means to capture each calibration color of said set in said trichromatic capture mode, resulting into a set of calibration device-dependent trichromatic color coordinates (Raw RGB) for each calibration color, means for estimating a parametric color transform such that any set of calibration device-dependent trichromatic color coordinates (Raw RGB) corresponding to a calibration color is transformed into a set of calibration device-independent color coordinates (XYZ) corresponding to the same calibration color, means for building a color calibration transform by the concatenation of the parametric color transform with the output color transform, means to transform any color captured from said scene using said color calibration transform.

Preferably, the invention comprises the steps of or the means for:

clustering the colors of pixels of an image representative of the specific scene captured by said first image capture device into a plurality of color clusters, among said plurality, selecting a set of color clusters independently of a colour checker chart, defining the set of calibration colors within said scene such that each calibration color corresponds to a different selected color cluster.

Preferably, the clustering is performed such that each color cluster is defined to contain pixels that are spatially close together in said representative image and that have close device-dependent color coordinates (Raw RGB).

BRIEF DESCRIPTION OF DRAWINGS

The invention will be more clearly understood on reading the description which follows, given by way of non-limiting example and with reference to the appended figures in which FIG. 1, already referred to, illustrates the difference between metameric pairs leading to non-invertible relations between RGB and XYZ color coordinates.

DESCRIPTION OF EMBODIMENTS

In the following, one possibility of implementation of the method according to the present invention is described for a video camera as image capture device. This method can be applied to any image capture device. A video camera captures several images per seconds, called frames. For calibration of this camera for a given scene, it is required that the video camera captures at least one image (frame) that is representative for the colors of this scene. This can be done by using the still picture mode of the camera or by taking one frame out of a series of a captured video. In this representative image of this scene (as in any image), each pixel has a position in the 2D image space, often referred to as x and y. In case of a trichromatic camera, for example the usual red-green-blue, each pixel is also defined by three color coordinates, R, G, and B, respectively.

The first step of the method according to the invention is to choose a set of calibration colors within this scene, more precisely in the at least one representative image of this scene. One possibility is to choose these calibration colors manually in this representative image according to the artistic understanding of representative colors in the scene. We choose here another possibility consisting in capturing an image of the scene using the video camera and selecting a set of calibration colors by an automatic image processing method. Such a selection is independent of any colour checker chart. This automatic method clusters the pixels of the image and their color coordinates. For clustering, each pixel is represented by a point in a clustering space. One possibility is to choose a three dimensional clustering space. The three dimensions are R,G,B. In this case, the operation can be called "color clustering". Another possibility is to choose a two dimensional clustering space. The two dimensions are x,y. In this case, the operation can be called "image sampling". Yet another possibility is to choose a five dimensional clustering space. The five dimensions are R,G,B,x,y. In this case, the operation can be called "color image segmentation". Here, we choose to use the "color clustering" method to choose a set of calibration colors within the scene, independently of any colour checker chart.

Several color clustering methods can be used according to P. Berkhin in "A survey of clustering data mining techniques" part of "Grouping Multidimensional Data—Recent Advances in Clustering" edited by J. Kogan, C. Nicholas and M. Teboulle and published by Springer in 2006.

For example, partition-relocation clustering methods divide the points in clustering space into clusters using heuristic rules to choose plausible cluster sets out of the huge number of possible partitions. In opposite to hierarchical clustering, clusters are revisited and iteratively refined. We use a partition-based cost function. The cost function is based on the current partition. In order to calculate cost changes by relocation, clusters have representatives. We use the k-means algorithm where the representative is the center of the cluster.

The k-means algorithm is described by the following scheme:
1. Subsample the representative image of the scene in a regular manner, resulting in image pixels to be clustered. A typical subsampling factor is 1000.
2. Establish set of points in clustering space corresponding to the pixels of the representative image to be clustered.
3. Randomly chose k points out of the set representing the initial cluster centers. A typical value for parameter k is 500.
4. Saving the initial cluster centers as set of color cluster centers.
5. Set an iteration counter n to 1.
6. For each point of the set of k points, compute the distance with each cluster center of the set of cluster centers and associate each point with the closest cluster. Hereby, clusters are built.
7. For each cluster, calculate the mean in clustering space of all points associated to this cluster.
8. Update the set of cluster centers by the set of means.
9. Increment n.
10. Continue with step 6 if n<N or if the update leads to changes in the cluster centers larger than a predetermined value D. A typical value for N is 30. D is a distance in clustering space and specifies the precision of the method. A typical value for D can be 5.

The cluster centers obtained by the color clustering method above are then chosen, i.e. selected, as calibration colors for the scene. Such a selection is then performed independently of any colour checker chart.

The second step is to measure each calibration color of the set that is obtained through the color clustering method above. In order to perform this second step, the representative image captured in the first step above is displayed on a display device with marks marking the positions of the calibration colors on the display, for instance by using false colors (for example black or white pixels). Then, by using a photometer, the device-independent color coordinates XYZ of the calibration colors are measured in the scene. The photometer is positioned close to the camera in a way to not influence too much the light distribution in the scene. One by one, a set of three calibration device-Independent color coordinates XYZ is measured for each calibration color, that represents this calibration color in a colorimetric color space.

Another possibility is to use an imaging photometer that can capture a calibration image from the whole scene and can measure a set of three calibration device-independent color coordinates XYZ for each pixel of the calibration image. By comparing the representative image captured in step one with the calibration image, a set of three calibration device-independent color coordinates XYZ can be obtained for each calibration color.

The third step is to capture an image representative of the scene by using the video camera. As being representative, this representative image would include the calibration colors. In this captured representative image, a set of calibration device-dependent color coordinates—Raw RGB—is identified to represent each calibration color in the device-dependent color space specific to the video camera. As representative image, one also may reuse the representative image captured in the first step.

The fourth step is to estimate a parametric color transform such that any set of calibration device-dependent color coordinates—Raw RGB—corresponding to a calibration color is transformed into a set of calibration device-independent color coordinates XYZ corresponding to the same calibration color. Here, a well-known transform based on thin plate spline interpolation is used. Thin plate spline is a physically based 3D interpolation scheme for arbitrarily spaced tabulated data. These splines are the generalization of the natural cubic splines in 1D. The result is then a function f such that $(X,Y,Z)=f(R,G,B)$.

The fifth step of the method according to the invention is to build the final color calibration transform by the concatenation of the parametric color transform obtained in the fourth step above with the output color transform in the following way:

$$\begin{pmatrix} R' \\ G' \\ B' \end{pmatrix} = NPM^{-1} f \begin{pmatrix} R \\ G \\ B \end{pmatrix}$$

Where f is the parametric color transform in the fourth step above and $NPM^{-1}$ is the output color transform (a 3×3 matrix) from the annex B of the Recommended Practice RP 177-1993 entitled "Derivation of Basic Television Color Equations" from the SMPTE. This output color transform is predetermined such as to be able to transform any set of device-independent color coordinates XYZ representing any color in the above colorimetric color space into a set of output device-dependent color coordinates R'G'B' representing the same color in a specific output color space, for example such as proposed by the mentioned SMPTE document.

In the following second embodiment, the method of color calibration according to the invention is applied to a second video camera and is based on the previous color calibration of a first video camera, whatever is the color calibration method used for this first camera, as soon as, during this previous color calibration, a first parametric color transform of a first image capture device has been determined that allows the transformation of any set of $1^{st}$-device—dependent color coordinates—Raw $R_1G_1B_1$—resulting from the capture of a color by this first image capture device into a corresponding set of device-independent color coordinates (XYZ) representing the captured color in the colorimetric color space. To determine this first parametric color transform, the color calibration according to the invention may be advantageously used, based on the above embodiment.

The calibration of the second video camera is done as follows. After having chosen a set of calibration colors within the scene as previously described, each calibration color is first captured by using the first video camera, resulting into a set of calibration $1^{st}$-device-dependent color coordinates—Raw $R_1G_1B_1$—for each calibration color, and each calibration color is secondly captured by using the second image capture device, resulting into a set of calibration 2nd-device-dependent color coordinates—Raw $R_2G_2B_2$—for each calibration color.

Then, by using said first parametric color transform, a set of three calibration device-independent color coordinates XYZ is calculated for each set of calibration $1^{st}$-device-dependent color coordinates—Raw $R_1G_1B_1$, in order to represent each calibration color in the colorimetric color space.

As previously described, a second parametric color transform is then estimated such that any set of calibration $2_{nd}$-device-dependent color coordinates—Raw $R_2G_2B_2$—corresponding to a calibration color is transformed into a calculated set of calibration device-independent color coordinates XYZ corresponding to the same calibration color, and the final color calibration transform is built by the concatenation of the second parametric color transform with the output color transform.

This second embodiment is particularly useful for the capture of scene that requires a plurality of cameras, notably to get different views of a scene, taken under different viewpoints. Using the method according to this second embodiment allows advantageously to have these different views color calibrated consistently between the different cameras.

In the following third embodiment, the video camera has advantageously a multispectral mode, allowing a specific embodiment of the color calibration method according to the present invention.

A multispectral camera has sensors with M>3 different spectral densities, whereas usual, trichromatic cameras have sensors with only three different spectral densities, generally in the red, the green and the blue part of the visible spectrum. See for instance, the multispectral camera sold by FluxData, notably model FD-1665-MS-7 which provides six spectral channels distributed in visible wavelengths.

It is assumed here that the video camera has two modes: multispectral (referred to as a supplementary image capture device) and trichromatic (referred to as image capture device to be calibrated).

In the multispectral capture mode, all light sensors (e.g. CCD elements) of the camera are active. We assume that there are M>3 different sensor types with M different spectral densities. In such cameras, the different sensor types are for example distributed all over the image area according to the so-called mosalcing principle such that P≥M neighboring sensors with M different spectral densities build one image pixel. Color precision is high, since sensors with M>3 different spectral densities are used. The camera outputs M>3 device-dependent color coordinates. On the other hand, spatial resolution is low, since P sensors are reduced to only one image pixel. Furthermore, some of the sensor elements may have spectral densities with low integration surface, i.e. a small flow of captured light. These sensors may have increased noise levels.

In the trichtomatic capture mode which is used for the usual capture of images in a scene, only sensors with R, G, or B usual type of spectral densities are used. The camera outputs 3 device-dependent color coordinates. An advantage of the trichromatic capture mode is that a resulting image with lower noise can be achieved, if the R,G,B spectral intensities are wide. Instead of reduced noise, a reduced exposure time can be achieved. The color precision is lower than in multispectral mode. It may further be possible by programmable filters that sensors with other spectral densities than R,G,B are reprogrammed to have R,G,B spectral densities. In this case, the image resolution in trichromatic mode is higher.

Using such a multispectral camera, the color calibration method according to the invention is preferably implemented as follows. After having chosen the set of calibration colors in the scene to capture as already described for the main embodiment, the method according to the invention is performed according to the following steps:

capture of each calibration color in the multispectral capture mode, resulting into a set of calibration device-dependent multispectral color coordinates—Raw Multispectral—for each calibration color, from a given predetermined calibration of the multispectral capture mode (calibrated by using the described method above or any other calibration method), calculation of a set of three calibration device-independent color coordinates XYZ for each set of calibration device-dependent multispectral color coordinates (Raw Multispectral), in order to represent each calibration color in the colorimetric color space as previously described, as previously described, capture of each calibration color in the trichromatic capture mode, resulting into a set of calibration device-dependent trichromatic color coordinates—Raw RGB—for each calibration color, fourth and fifth steps as previously described above.

Therefore, advantageously, the method according to the invention when based on this third embodiment can be implemented by using only the video camera, without any supplemental equipment as a photometer.

Although the illustrative embodiments of the invention have been described herein with reference to the accompanying drawings, it is to be understood that the present invention is not limited to those precise embodiments, and that various changes and modifications may be effected therein by one of ordinary skill in the pertinent art without departing from the invention. All such changes and modifications are intended to be included within the scope of the present invention as set forth in the appended claims.

It is to be understood that the invention as embodied above may use various forms of hardware, software, firmware, special purpose processors, or combinations thereof. Some of the various processes described above may be either part of an application program, which may be executed by a CPU.

While the present invention is described with respect to particular and preferred embodiments, it is understood that the present invention is not limited to these embodiments. The present invention as claimed therefore includes variations from these particular and preferred embodiments described herein, as will be apparent to one of skill in the art. While some of the specific embodiments may be described and claimed separately, it is understood that the various features of embodiments described and claimed herein may be used in combination.

The invention claimed is:

1. A method to build a color calibration transform for the color calibration of a second image capture device adapted for the capture of a specific scene, said color calibration being adapted to represent the captured colors of said scene in a specific output color space, wherein an output color transform is predetermined that is able to transform any set of device-independent color coordinates representing any color in a given colorimetric color space into a set of output device-dependent color coordinates representing said color in said specific output color space, wherein a first parametric color transform of a first image capture device is determined that allows the transformation of any set of 1st-device-dependent color coordinates resulting from the capture of a color by said first image capture device into a corresponding set of device-independent color coordinates representing the captured color in the colorimetric color space, said method comprising:
clustering the colors of pixels of an image representative of said specific scene captured by said first image capture device into a plurality of color clusters,
among said plurality, selecting a set of color clusters independently of a color checker chart,
defining a set of calibration colors within said scene such that each calibration color corresponds to a different selected color cluster,
by using said first image capture device, capturing each calibration color, resulting into a set of calibration 1st-device-dependent color coordinates for each calibration color,
by using said first parametric color transform, calculation of a set of three calibration device-independent color coordinates for each set of calibration 1st-device-dependent color coordinates in order to represent each calibration color in the colorimetric color space,
by using said second image capture device, capturing each calibration color, resulting into a set of calibration 2nd-device-dependent color coordinates for each calibration color,
estimating a second parametric color transform such that any set of calibration 2nd-device-dependent color coordinates representing a captured calibration color is transformed into a calculated set of calibration device-independent color coordinates corresponding to the same calibration color, and
building said color calibration transform by the concatenation of the second parametric color transform with the output color transform.

2. The method according to claim 1 wherein each color cluster is defined to contain pixels that are spatially close together in said representative image and that have close device-dependent color coordinates.

3. Image capture device having two capture modes such as to be able to represent any color from a scene to capture both by a set of three device-dependent color coordinates in a trichromatic capture mode, and by a set of M device-dependent color coordinates in a multispectral capture mode, wherein M>3, comprising:
means for clustering the colors of pixels of an image representative of said specific scene captured by said image capture device into a plurality of color clusters,
means for selecting, among said plurality, a set of color clusters independently of a color checker chart,
means for defining a set of calibration colors within a scene to capture such that each calibration color corresponds to a different selected color cluster, means to capture each calibration color of said set in said multispectral capture mode, resulting into a set of M calibration device-dependent multispectral color coordinates for each calibration color, said means being pre-calibrated and an output color transform being predetermined to transform any set of M calibration device-dependent multispectral color coordinates representing a color into a set of three calibration device-independent color coordinates representing this color into a colorimetric color space,
means for capturing each calibration color of said set in said trichromatic capture mode, resulting into a set of calibration device-dependent trichromatic color coordinates for each calibration color,
means for estimating a parametric color transform such that any set of calibration device-dependent trichromatic color coordinates representing a calibration color is transformed into a set of calibration device-independent color coordinates representing the same calibration color in said colorimetric color space,
means for building a color calibration transform by the concatenation of the parametric color transform with the output color transform, and
means for transforming any color captured from said scene in the trichromatic capture mode using said color calibration transform.

4. The image capture device according to claim 3 wherein the means for clustering are configured such that each color cluster is defined to contain pixels that are spatially close together in said representative image and that have close device-dependent color coordinates.

5. An image capture device having two capture modes so as to be able to represent any color from a scene to capture both by a set of three device-dependent color coordinates in a trichromatic capture mode, and by a set of M device-dependent color coordinates in a multispectral capture mode, wherein M>3, the image capture device comprising:
at least one processor and related memory configured to:
cluster the colors of pixels of an image representative of said specific scene captured by said image capture device into a plurality of color clusters;
select, among said plurality, a set of color clusters independently of a color checker chart;
define a set of calibration colors within a scene to capture such that each calibration color corresponds to a different selected color cluster, and to capture each calibration color of said set in said multispectral capture mode, resulting into a set of M calibration device-dependent multispectral color coordinates for each calibration color, said one or more processors being further configured to define a set of calibration colors being pre-calibrated and an output color transform being predetermined to transform any set of M calibration device-dependent multispectral color coordinates representing a color into a set of three calibration device-independent color coordinates representing this color into a colorimetric color space;
capture each calibration color of said set in said trichromatic capture mode, resulting into a set of calibration device-dependent trichromatic color coordinates for each calibration color;
estimate a parametric color transform such that any set of calibration device-dependent trichromatic color coordinates representing a calibration color is transformed into a set of calibration device-independent color coordinates representing the same calibration color in said colorimetric color space;

build a color calibration transform by the concatenation of the parametric color transform with the output color transform; and transform any color captured from said scene in the trichromatic capture mode using said color calibration transform.

6. The image capture device according to claim 5, wherein the at least one processor and related memory is further configured such that each color cluster is defined to contain pixels that are spatially close together in said representative image and that have close device-dependent color coordinates.

* * * * *